United States Patent
Tseng

(10) Patent No.: US 9,052,385 B2
(45) Date of Patent: Jun. 9, 2015

(54) SUN TRACKING DEVICE AND SOLAR CELL SYSTEM

(71) Applicant: HON HAI PRECISION INDUSTRY CO., LTD., New Taipei (TW)

(72) Inventor: Yung-Chang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/256,096

(22) Filed: Apr. 18, 2014

(65) Prior Publication Data

US 2014/0318598 A1    Oct. 30, 2014

(30) Foreign Application Priority Data

Apr. 25, 2013  (TW) ............................... 102114768 U

(51) Int. Cl.
*H01L 31/042*   (2014.01)
*G01S 3/786*    (2006.01)

(52) U.S. Cl.
CPC ............... *G01S 3/7861* (2013.01); *H02S 20/00* (2013.01); *Y02E 10/50* (2013.01)

(58) Field of Classification Search
CPC ... H01L 31/0522; H01L 31/042; H02S 20/00; G01S 3/7861; F24J 2/38; F24J 2/54; F24J 2/5269
USPC .......................................................... 136/246
See application file for complete search history.

(56) References Cited

U.S. PATENT DOCUMENTS

| | | | |
|---|---|---|---|
| 2003/0136397 A1* | 7/2003 | Kinoshita | 126/600 |
| 2006/0118162 A1* | 6/2006 | Saelzer et al. | 136/246 |
| 2008/0238195 A1* | 10/2008 | Shaver et al. | 307/18 |
| 2009/0084431 A1* | 4/2009 | Briee et al. | 136/246 |
| 2009/0229597 A1* | 9/2009 | Choi et al. | 126/578 |
| 2012/0138123 A1* | 6/2012 | Newdoll et al. | 136/246 |
| 2012/0167871 A1* | 7/2012 | Falbel | 126/576 |
| 2013/0006435 A1* | 1/2013 | Berrios et al. | 700/295 |

* cited by examiner

*Primary Examiner* — Golam Mowla
(74) *Attorney, Agent, or Firm* — Novak Druce Connolly Bove + Quigg LLP

(57) ABSTRACT

A sun tracking device comprises a light sensing module, a processing module, a control module, and a driving module. The light sensing module includes eight light sensors, a pole fixing portion, and a pole. The eight light sensors each have a light sensing surface. The pole fixing portion has a fixing surface. The eight light sensing surfaces and the fixing surface cooperatively form a 3×3 grid, and the fixing surface is in the middle of the grid. The pole extends from the fixing surface. The processing module is configured for determining the direction of the sun, and calculating a rotating direction and angle of the light sensing module. The control module is configured for sending out a rotating instruction. The driving module is configured for driving the light sensing module to rotate so that the sunlight perpendicularly shines onto the light sensing surface.

17 Claims, 3 Drawing Sheets

SUN TRACKING DEVICE AND SOLAR CELL SYSTEM

FIELD

The disclosure relates to a sun tracking device and solar cell system.

BACKGROUND

At present, a solar collection system includes a light incident surface facing the sun. An angle of the light incident surface is continually adjusted as the sun moves. The angle of the light incident surface is predetermined based on theoretic sun movement, not on actual sun movement, which is unreliable.

What is needed, therefore, is a sun tracking device and solar cell system providing dependable collection of solar energy.

BRIEF DESCRIPTION OF THE DRAWING

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE DISCLOSURE

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
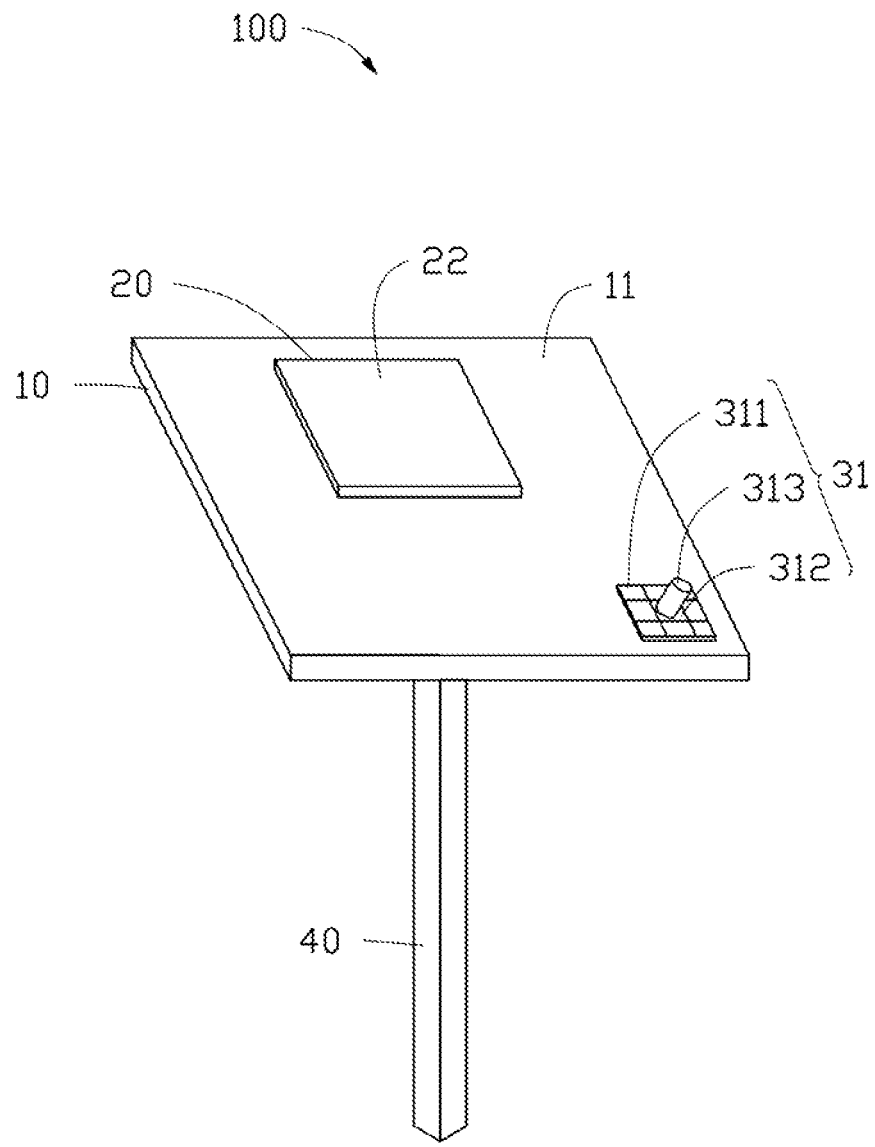
FIG. 1 is an isometric view of an embodiment of a solar cell system including a sun tracking device.
Figure 2:
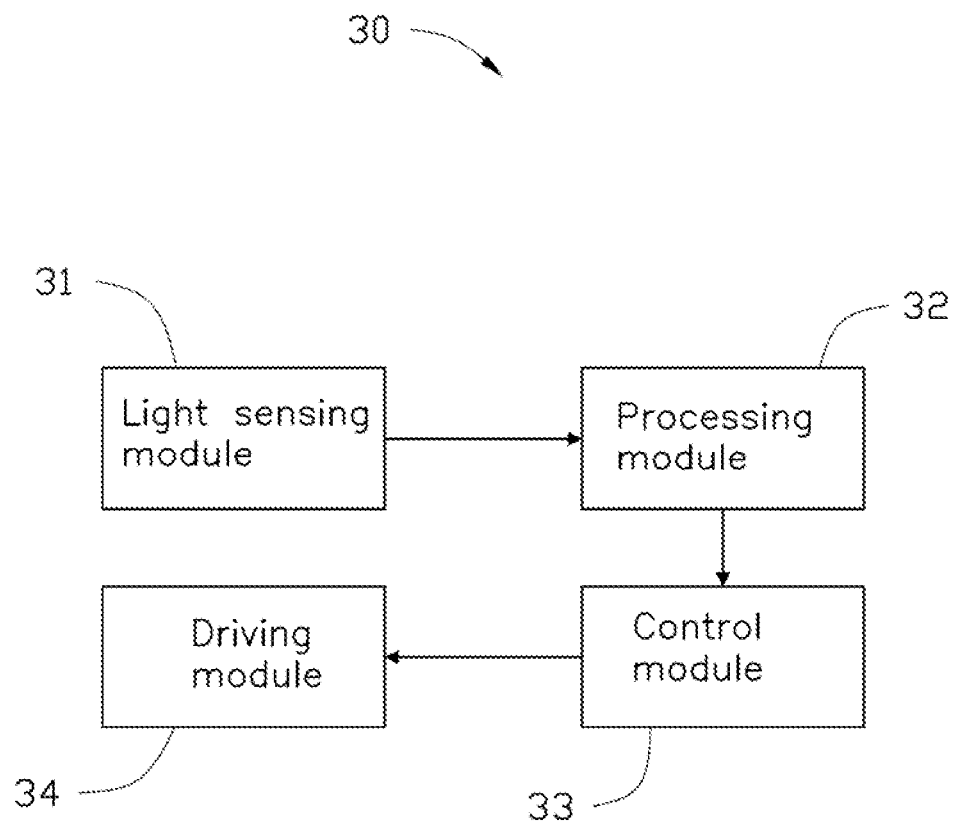
FIG. 2 is a block diagram of an embodiment of the sun tracking device of the solar cell system.

FIGS. 1-2 illustrate an embodiment of a solar cell system 100. The solar cell system 100 includes a base 10, a solar panel 20, and a sun tracking device 30.

In this embodiment, the base 10 is a substantially rectangular plate. The base 10 includes a support surface 11. The base 10 is supported by a supporter 40.

The solar panel 20 is located on the support surface 11. The solar panel 20 includes a light incident surface 22. In this embodiment, the light incident surface 22 is substantially flat. The solar panel 20 receives sunlight from the light incident surface 22, and converts the sunlight into electricity.

The sun tracking device 30 includes a light sensing module 31, a processing module 32, a control module 33, and a driving module 34.

Figure 3:
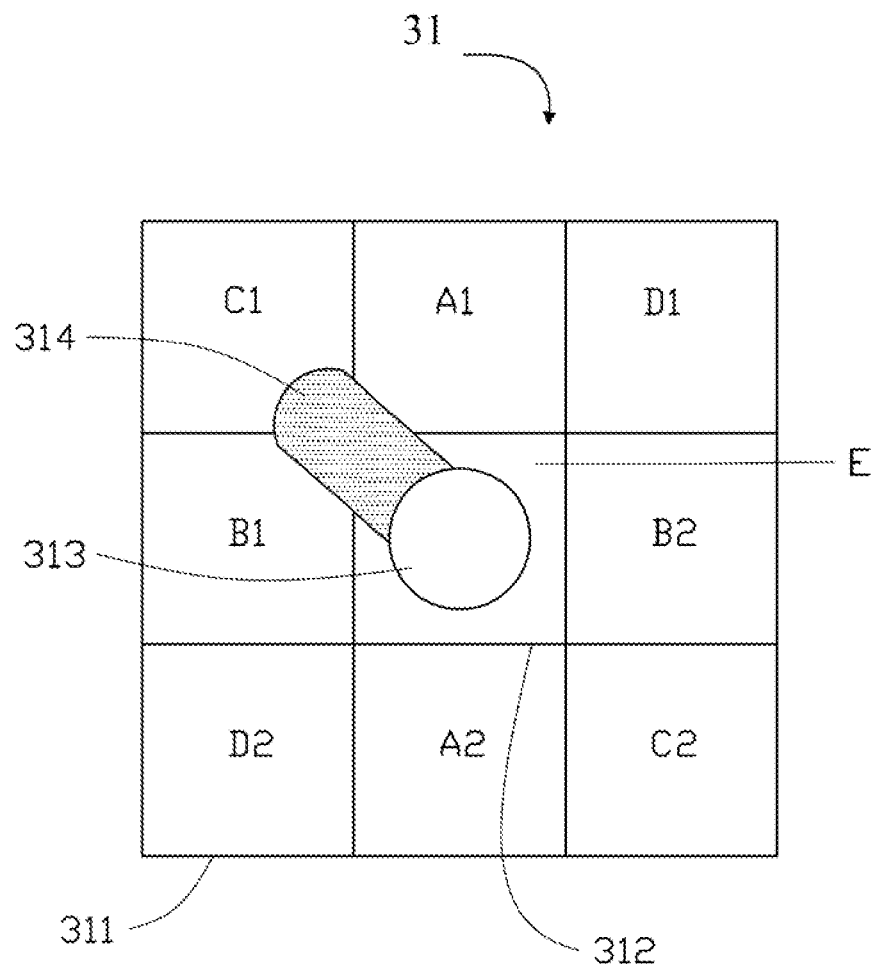
FIG. 3 is a top view of a light sensing module of the sun tracking device in FIG. 1.

Referring to FIG. 3, the light sensing module 31 includes eight light sensors 311, a pole fixing portion 312, and a pole 313. The eight light sensors 311 and the pole fixing portion 312 are located on the support surface 11. The eight light sensors 311 each have a light sensing surface. In FIG. 3, the eight light sensing surfaces are designated as A1, A2, B1, B2, C1, C2, D1, and D2. The pole fixing portion 312 includes a fixing surface E. The light sensing surfaces, the fixing surface E, and the light incident surface 22 are substantially parallel to each other. In this embodiment, the light sensing surfaces and the fixing surface E are substantially coplanar. The light sensing surfaces and the fixing surface E are arranged in a 3×3 grid. The fixing surface E is in the middle of the grid. In this embodiment, shapes of the light sensing surfaces and the fixing surface E are all substantially square, and sizes of the light sensing surfaces are substantially equal to a size of the fixing surface E. The light sensing surface A1 is symmetric with the light sensing surface A2 with respect to the fixing surface E. The light sensing surface B1 is symmetric with the light sensing surface B2 with respect to the fixing surface E. The light sensing surface C1 is symmetric with the light sensing surface C2 with respect to the fixing surface E. The light sensing surface D1 is symmetric with the light sensing surface D2 with respect to the fixing surface E. The light sensing surfaces C1, C2, D1, and D2 are located at four respective corners of the grid. The eight light sensing surfaces are aligned with eight respective directions, such as north, south, west, east, northwest, southeast, northeast, and southwest. In this embodiment, the eight light sensors 311 are all photoelectric sensors. Each light sensor 311 can generate different sensing currents and send out different sensing current signals when the corresponding light sensing surface receives different intensities of sunlight. In another embodiment, each light sensor 311 can also send out sensing voltage signals.

The pole 313 substantially perpendicularly extends from the fixing surface E. In this embodiment, the pole 313 is substantially cylindrical. In other embodiments, the pole 313 can be other shapes, such as prism-shaped or wedge-shaped.

The processing module 32 is configured for receiving sensing signals sent from the light sensors 311, processing the sensing signals to determine a direction and an angle of the sun with respect to the fixing surface E, calculating a rotating direction and a rotating angle of the light sensing module 31, and sending out a rotating direction signal and a rotating angle signal to the control module 33. When the sunlight shines on the light sensing module 31 at an angle, the pole 313 will cast a shadow 314 onto one or more of the light sensing surfaces. As a result, current intensity of a sensing current generated from the one or more corresponding light sensors 311 covered by the shadow 314 is less than a current intensity of a sensing current generated from the symmetric one or more corresponding light sensors 311 not covered by the shadow 314. Thus, a current difference and a current ratio between the one or more light sensors 311 covered by the shadow 314 and the one or more symmetric light sensors 311 not covered by the shadow 314 can be calculated by the processing module 32. Then, the processing module 32 can determine the direction and the angle of the sun with respect to the light sensing module 31 based on the one or more current differences and current ratios, and calculate a rotating direction and rotating angle of the light sensing module 31. In the illustrated embodiment, the shadow 314 covers portions of the light sensing surfaces A1, C1, and B1. The processing module 32 calculates the current differences and the current ratios between the light sensors 311 corresponding to the light sensing surfaces A1, C1, and B1 and the respective symmetric light sensors 311 corresponding to the light sensing surfaces A2, C2, and B2. Thereafter, the processing module 32 determines that the direction of the sun with respect to the fixing surface E is southeast, calculates a size of the shadow 314 based on the current ratios, and determines the angle of the sun with respect to the light sensing module 31 based on the size of the shadow 314. Finally, the processing module 32 calculates and sends out the rotating direction and rotating angle signals to the control module 33.

The control module 33 is configured for receiving the rotating direction and rotating angle signals sent from the processing module 32, and generating a rotating direction instruction and a rotating angle instruction for the driving module 34.

The driving module 34 is connected to the base 10. The driving module 34 is configured for driving the base 10 to rotate in the rotating direction and angle based on the rotating direction instruction and the rotating angle instruction. Thus, the base 10 is capable of driving the light sensing module 31 to rotate, so that the light incident surface 22 is perpendicular to the direction of sunlight to receive the greatest amount of sunlight. The driving module 34 can be a multi-direction rotary driver. The driving module 34 can be arranged below the base 10 or on a side of the base 10. The driving module 34 can also be supported by the supporter 40.

In use, the supporter 40 is fixed in a predetermined place, such that the base 10 is also fixed in the predetermined place. The sun tracking device 30 is set to track the sun at regular intervals, such as every thirty minutes. At each interval, the direction and angle of the light sensors 311 relative to the sun are adjusted, until the light incident surface 22 of the solar panel 20 is perpendicular to the sun.

The sun tracking device 30 can track the direction of the sun and adjust the direction and angle of the light incident surface 22 of the solar panel 20 based on the movement of the sun. Thus, collection of solar energy is improved.

It is to be understood that the described embodiments are intended to illustrate rather than limit the disclosure. Variations may be made without departing from the spirit of the disclosure as claimed. The above-described embodiment illustrates the scope of the disclosure but do not restrict the scope of the disclosure.

What is claimed is:

1. A sun tracking device, comprising:
   a light sensing module, the light sensing module comprising:
      eight light sensors, the eight light sensors each having a light sensing surface, each light sensor configured for generating a sensing current and sending out a sensing signal when the corresponding light sensing surface receives sunlight;
      a pole fixing portion, the pole fixing portion comprising a fixing surface, the eight light sensing surfaces and the fixing surface being arranged in a 3×3 grid, the fixing surface being in the middle of the grid; and
      a pole substantially perpendicularly extending from the fixing surface, the pole configured for shadowing at least one of the eight light sensing surfaces when the sun light shines on the light sensing module at an angle;
   a processing module configured for receiving the sensing signal sent from the light sensors, processing the sensing signal to determine a direction and an angle of the sun with respect to the fixing surface, calculating a rotating direction and a rotating angle of the light sensing module, and sending out a rotating direction signal and a rotating angle signal;
   a control module configured for receiving the rotating direction and rotating angle signals sent from the processing module, generating a rotating instruction, and send the rotating instruction to the driving module; and
   a driving module configured for driving the light sensing module to rotate in the rotating direction and angle based on the rotating instruction, thus the eight light sensing surfaces being capable of keeping the fixing surface perpendicular to the sunlight.

2. The sun tracking device of claim 1, wherein the eight light sensing surfaces and the fixing surface are all square-shaped.

3. The sun tracking device of claim 1, wherein the eight light sensors are all photoelectric sensors, and the sensing signal is a sensing current signal.

4. The sun tracking device of claim 1, wherein the eight light sensors are all photoelectric sensors, and the sensing signal is a sensing voltage signal.

5. The sun tracking device of claim 1, wherein the pole is cylinder-shaped.

6. The sun tracking device of claim 1, wherein the eight light sensing surfaces and the fixing surface are substantially coplanar.

7. The sun tracking device of claim 1, wherein the eight light sensing surfaces are aligned with eight respective directions, as north, south, west, east, northwest, southeast, northeast, and southwest.

8. A solar cell system, comprising:
   a base;
   a solar panel arranged on the base, the solar panel comprising a light incident surface; and
   a sun tracking device arranged on the base, the sun tracking device comprising:
      a light sensing module, the light sensing module comprising:
         eight light sensors, the eight light sensors each having a light sensing surface, the light sensing surface being parallel with the light incident surface, each light sensor configured for generating a sensing current and sending out a sensing signal when the corresponding light sensing surface receives sunlight;
         a pole fixing portion, the pole fixing portion comprising a fixing surface, the fixing surface being parallel with the light incident surface, the eight light sensing surfaces and the fixing surface being arranged in a 3×3 grid, the fixing surface being in the middle of the grid; and
         a pole substantially perpendicularly extended from the fixing surface, the pole configured for shadowing at least one of the eight light sensing surfaces when the sun light shines on the light sensing module at an angle;
      a processing module configured for receiving the sensing signal sent from the light sensors, processing the sensing signal to determine a direction and an angle of the sun with respect to the fixing surface, calculating a rotating direction and a rotating angle of the light sensing module, and sending out a rotating direction signal and a rotating angle signal;
      a control module configured for receiving the rotating direction and angle signals sent from the processing module, generating a rotating instruction, and sending the rotating instruction to the driving module; and
      a driving module connected to the base, the driving module configured for driving the base to rotate based on the rotating instruction, then the base being capable of driving the light sensing module and the solar panel to rotate.

9. The solar cell system claim 8, wherein the base comprises a support surface, and the solar panel and the light sensing module are arranged on the support surface.

10. The solar cell system claim 8, wherein the base is supported by a supporter to be fixed.

11. The solar cell system claim 10, wherein the driving module is arranged below the base, and the driving module is supported by the supporter.

12. The solar cell system claim 8, wherein the eight light sensing surfaces and the fixing surface are all square-shaped.

13. The solar cell system claim 8, wherein the eight light sensors are all photoelectric sensors, and the sensing signal is a sensing current signal.

14. The solar cell system claim 8, wherein the eight light sensors are all photoelectric sensors, and the sensing signal is a sensing voltage signal.

15. The solar cell system claim 8, wherein the pole is cylinder-shaped.

16. The solar cell system claim 8, wherein the eight light sensing surfaces and the fixing surface are substantially coplanar.

17. The solar cell system claim 8, wherein the eight light sensing surfaces are aligned with eight respective directions, as north, south, west, east, northwest, southeast, northeast, and southwest.

* * * * *